(12) United States Patent
Jang

(10) Patent No.: US 10,253,449 B2
(45) Date of Patent: Apr. 9, 2019

(54) BAR CODE PIECE TAG FOR MANAGING LAUNDRY AND METHOD OF CLASSIFYING AND TRANSFERRING LAUNDRY USING THE SAME

(71) Applicant: Ki Soo Jang, Daegu (KR)

(72) Inventor: Ki Soo Jang, Daegu (KR)

( * ) Notice: Subject to any disclaimer, the term of this patent is extended or adjusted under 35 U.S.C. 154(b) by 0 days.

(21) Appl. No.: 15/782,063

(22) Filed: Oct. 12, 2017

(65) Prior Publication Data

US 2019/0024302 A1    Jan. 24, 2019

(30) Foreign Application Priority Data

Jul. 19, 2017   (KR) .................. 10-2017-0091515

(51) Int. Cl.
*G06K 19/06* (2006.01)
*D06F 93/00* (2006.01)

(52) U.S. Cl.
CPC ..... *D06F 93/005* (2013.01); *G06K 19/06028* (2013.01)

(58) Field of Classification Search
CPC ............ G06Q 10/087; G06Q 10/0875; G06Q 20/203; G06Q 20/208; B07C 5/3412; D06F 95/00
See application file for complete search history.

(56) References Cited

U.S. PATENT DOCUMENTS

| | | | |
|---|---|---|---|
| 5,794,213 A * | 8/1998 | Markman | ............... D06F 95/00 705/22 |
| 9,984,356 B2 * | 5/2018 | Janis | .................... G06Q 10/087 |

(Continued)

FOREIGN PATENT DOCUMENTS

| KR | 20-2000-0000192 U | 1/2000 |
|---|---|---|
| KR | 10-20050000050 A | 1/2005 |

OTHER PUBLICATIONS

Quick Dry Cleaning Software Admin ("Is Losing Clothes in Dry cleaning Business Your Daily Routine?", Apr. 28, 2013, www.quickdrycleaning.com).*

(Continued)

*Primary Examiner* — Seung H Lee
(74) *Attorney, Agent, or Firm* — Sughrue Mion, PLLC

(57) ABSTRACT

Disclosed are a tag for managing laundry and a method of classifying and transferring laundry using the same. The tag for managing laundry includes a tag portion, a box number portion, a laundry number portion, and a barcode part. The tag portion includes another tag portion and is attached to each piece of laundry classified by customer. The box number portion for distinguishing between the laundry shops is formed by printing a unique number on one surface of each of the tag portions. The laundry number portion for checking the number of pieces of laundry left by customers is formed by printing the number of pieces of laundry left by the customers on one surface of the tag portion. The barcode part for facilitating transfer of laundered laundry from the laundry plant to the laundry shops is formed by printing a barcode including information of the box number portion and the laundry number portion on one surface of the tag portion.

The method of classifying and transferring laundry includes a step of collecting at least one piece of laundry left by customers at the laundry shops; a step of respectively attaching the tag portion to laundry left by the customers; a step of transferring the tag portion-attached laundry to a laundry plant; a step of scanning the barcode part of the tag portion respectively attached to the laundry by means of a barcode scanner when washing of the laundry transferred to the laundry plant is completed; and a step of classifying the laundry by laundry shop according to scanned information and transferring the classified laundry to the laundry shops.

6 Claims, 3 Drawing Sheets

(56) References Cited

U.S. PATENT DOCUMENTS

2005/0234869 A1* 10/2005 Massod ................ G06Q 10/087
2007/0261997 A1* 11/2007 Cassady ................ B07C 5/3412
                                                        209/3.3

OTHER PUBLICATIONS

Communication dated Nov. 29, 2018, issued by the Korean Patent Office in counterpart Korean Patent Application No. 10-2017-0091515.

* cited by examiner

[FIG. 1]
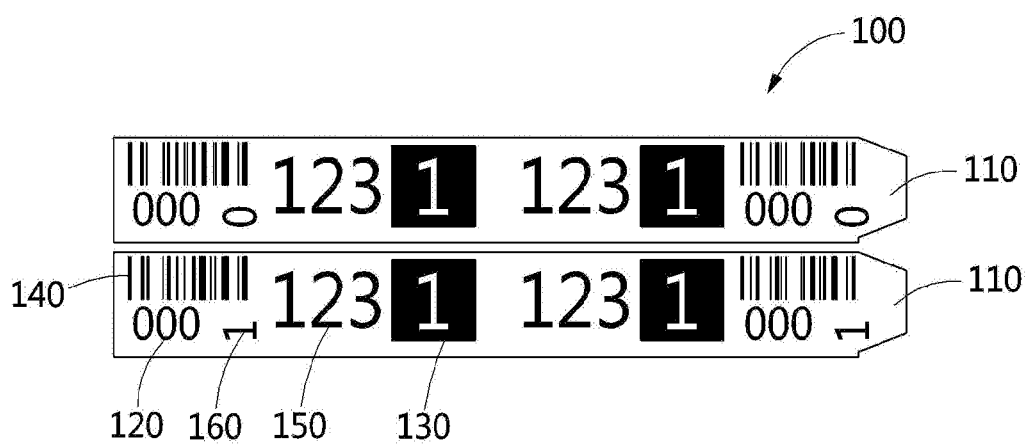

【FIG. 2】
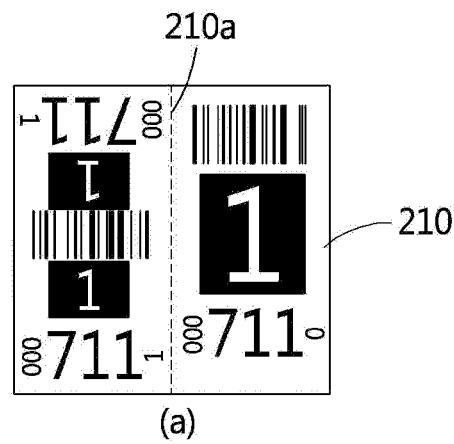
(a)
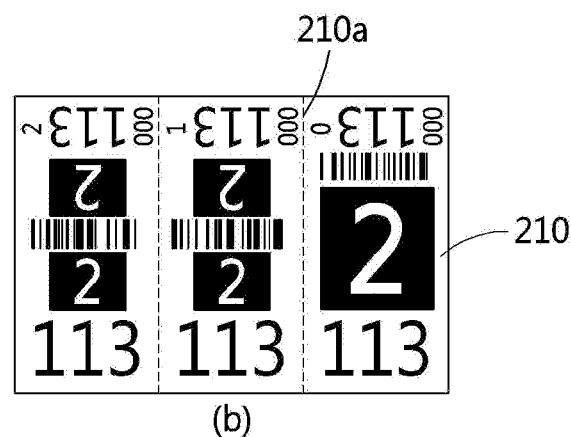
(b)
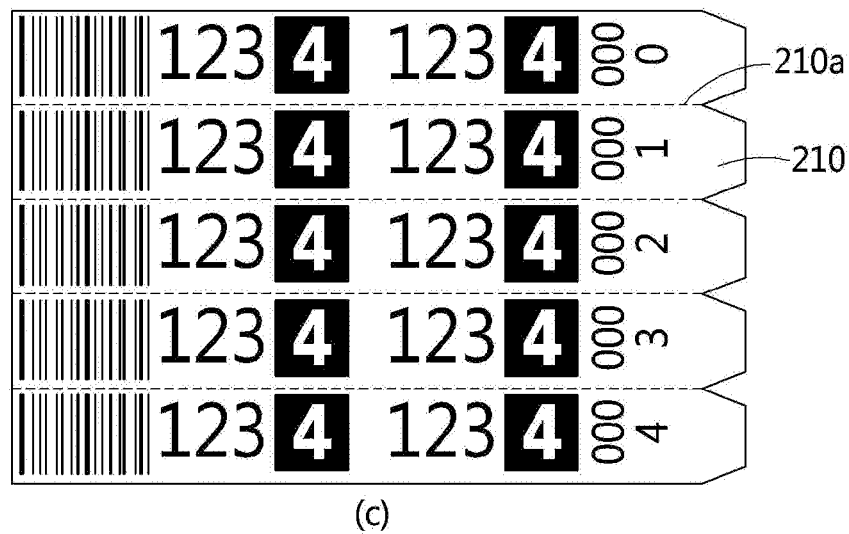
(c)

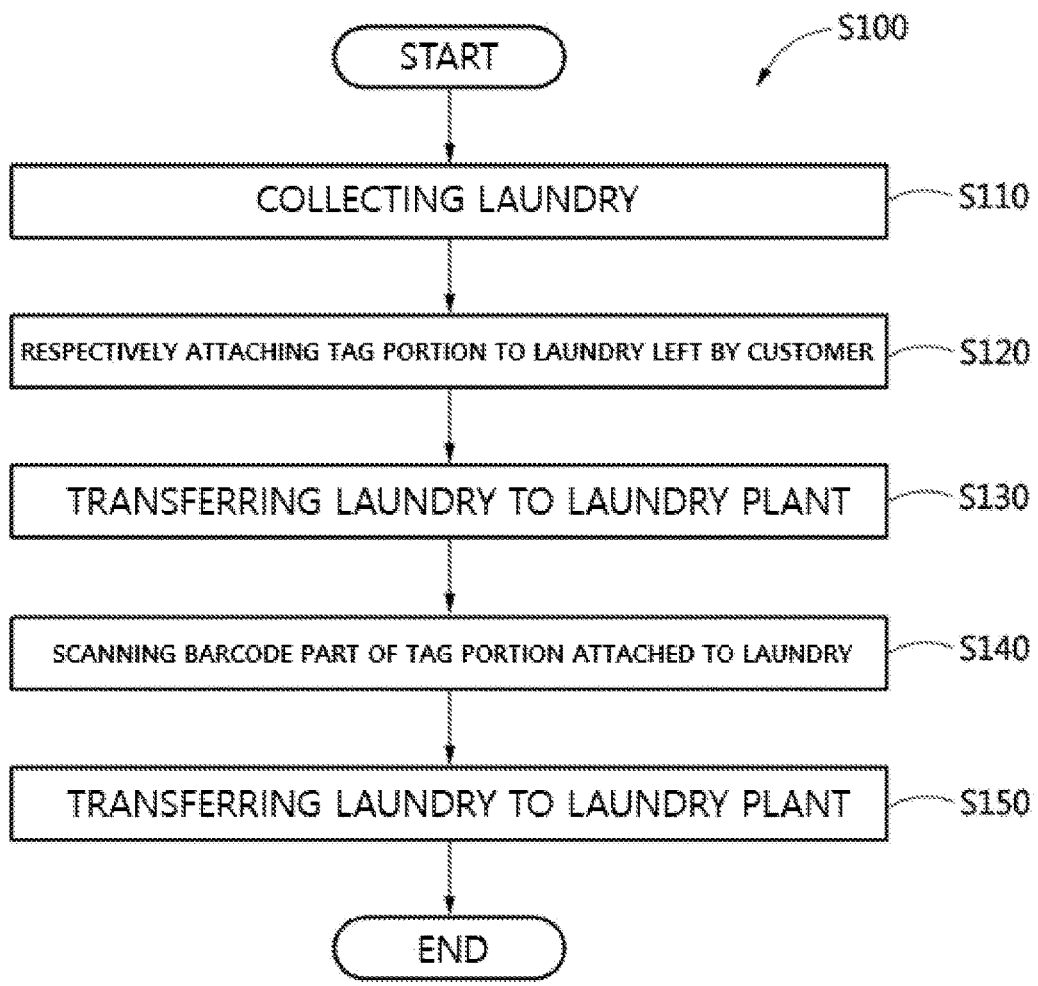
[FIG. 3]

BAR CODE PIECE TAG FOR MANAGING LAUNDRY AND METHOD OF CLASSIFYING AND TRANSFERRING LAUNDRY USING THE SAME

CROSS-REFERENCE TO RELATED APPLICATION

This application claims the priority benefit of Korean Patent Application No. 10-2017-0091515, filed on Jul. 19, 2017 in the Korean Intellectual Property Office, the disclosure of which is incorporated herein by reference.

BACKGROUND OF THE DISCLOSURE

Field of the Disclosure

The present disclosure relates to a tag for managing laundry to rapidly classify and transfer laundry and reduce loss of laundry delivered between a plurality of laundry shops and laundry plants and incorrect delivery there between, and a method of classifying and transferring laundry using the same.

Description of the Related Art

In general, the purpose of washing is to restore the beauty and hygienic functions of clothes and to improve the durability of clothes by releasing fatigue of fibers. To ensure durability of laundry, many people leave the laundry in laundry shops which specialize in laundry.

In recent years, to prevent continuous increase in the washing unit cost per piece of clothing due to redundant investment in unnecessary laundry equipment and increase in prices and personnel expenses and to reduce the environmental pollution resulting from use of the laundry equipment, washing-specialized laundry plants entrusted with laundry from laundry shops were established. Accordingly, small and medium laundry shops, which have received laundry from clients, transfer the laundry to a laundry plant, and the laundry plant washes the laundry transferred from the respective laundry shops at once.

In particular, laundry shops attach a tag, which is printed with a number for identifying laundry, a quantity of laundry, and the like, to laundry, and then the tag-attached laundry is transferred to laundry plants. In addition, when laundry plants complete washing, the laundry is classified by laundry shops through the attached tags and transferred to each piece of laundry shop.

Meanwhile, the tags are prefabricated products that are produced by a specialized wholesaler of laundry products, and laundry shops purchase and use the same. Since such tags were made before implementation of a current system that small and medium laundry shops entrust laundry to laundry plants and the laundry plants wash the laundry, a serial number range of the tags is narrow. Accordingly, tags with duplicate numbers are inevitable.

In addition, unlike laundry franchises wherein a head office installs an electronic system at affiliated laundry shops for a fee and provides batch management or post-service, small and medium laundry shops have difficulty in building an expensive electronic tagging system and consume considerable time to learn a use method of the same and to be skilled in using the same. Since the ability to cope with breakdown and emergency situations is low even if an electronic tagging system is built, operation of laundry shops may be hindered. Accordingly, there is no choice but to use prefabricated products having the possibility of incorrect delivery due to narrow serial number range.

Although the cost of washing has decreased due to laundry plants, there has been a problem that laundry is changed in a process of washing laundry collected from various laundry shops and then sending the same to the respective laundry shops.

Since laundry should be transferred to an original laundry shop again when the laundry is misdelivered, a lot of time and manpower are consumed and, further, a customer may protest or compensation for laundry delays may be demanded.

SUMMARY OF THE DISCLOSURE

Therefore, the present invention has been made in view of the above problems, and it is one object of the present invention to provide a tag for managing laundry to prevent a plurality of laundry shops from being provided with a tag for managing laundry having the same number by providing a box number portion for distinguishing between the laundry shops to a tag for managing laundry, which is previously manufactured by an external enterprise, to extend a serial number range of the tag for managing laundry, and a method of classifying and transferring laundry using the same.

It is another object of the present invention to provide a tag for managing laundry to allow easy management in laundry plants and reduction in laundry classification time by providing a barcode part including various laundry information to the tag for managing laundry, and a method of classifying and transferring laundry using the same.

In accordance with an aspect of the present invention, the above and other objects can be accomplished by the provision of a tag for managing laundry including a tag portion, a box number portion, a laundry number portion, and a barcode part. The tag portion includes another tag portion and is attached to each piece of laundry classified by a customer. The box number portion for distinguishing between the laundry shops is formed by printing a unique number on one surface of each of the tag portions. The laundry number portion for checking the number of pieces of laundry left by customers is formed by printing the number of pieces of laundry left by the customers on one surface of the tag portion. The barcode part for facilitating transfer of laundered laundry from the laundry plant to the laundry shops is formed by printing a barcode including information of the box number portion and the laundry number portion on one surface of the tag portion.

In accordance with another aspect of the present invention, there is provided a method of classifying and transferring laundry, the method including a step of collecting laundry, a step of respectively attaching a tag portion to laundry left by a customer, a step of transferring the laundry to a laundry plant, a step of scanning a barcode part of the tag portion attached to the laundry, and a step of transferring the laundry to laundry shops. In the step of collecting laundry, at least one piece of laundry left by a customer is collected by laundry shops. In the step of respectively attaching a tag portion to laundry left by a customer, a box number portion for distinguishing laundry shops, a laundry number portion for checking the number of pieces of laundry left by the customer, and a tag portion printed with a barcode part including information of the box number portion and laundry number portion are attached to each piece of the laundry left by the customer. In the step of transferring laundry to a laundry plant, the tag portion-attached laundry is transferred to a laundry plant. In the step of scanning a barcode part of the tag portion attached to the laundry, the barcode part of the tag portion attached to the laundry is scanned by means of a barcode scanner when washing of laundry transferred to the laundry plant is completed. In the step of transferring laundry to laundry shops, the laundry is classified by laundry shop according to scanned information, and the classified laundry is transferred to the laundry shops.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 illustrates a tag for managing laundry according to an embodiment of the present disclosure;

FIG. 2 illustrates tag portions according to other embodiments with regard to the tag of FIG. 1; and FIG. 3 illustrates a block diagram of a method of classifying and transferring laundry of according to an embodiment of the present disclosure.

DETAILED DESCRIPTION OF THE DISCLOSURE

Hereinafter, a tag for preventing laundry loss and managing incorrect delivery and a method of classifying and transferring laundry using the same according to a preferred embodiment of the present disclosure are described in detail with reference to the accompanying drawings. Here, like reference numerals indicate like elements, and a repeated description and a detailed description of known functions and configurations that may make the subject matter of the present disclosure unclear will be omitted. Embodiments of the present disclosure are provided so that this disclosure will be thorough and complete, and will fully convey the concept of the invention to those skilled in the art. Accordingly, in the drawings, the shapes and sizes of elements may be exaggerated for clarity.

FIG. 1 illustrates a tag for managing laundry according to an embodiment of the present disclosure. Here, the tag for managing laundry is used to reduce loss and incorrect delivery of laundry transferred between a plurality of laundry shops and a laundry plant.

As illustrated in FIG. 1, a tag 100 for managing laundry includes a tag portion 110, a box number portion 120, a laundry number portion 130, a barcode part 140, a tag number portion 150, and a laundry-specific number portion 160.

A plurality of tag portions 110 may be individually attached to laundry classified by a customer. For example, when only one piece of laundry is left by a customer, only one tag portion 110 may be provided and attached to the laundry and, when ten pieces of laundry are left by a customer, ten tag portions 110 may be provided and attached to each piece of laundry.

The tag portion 110 may also be attached to an invoice issued to a customer. Here, the invoice is a kind of document that shows the name and telephone number of a customer, the type, color, and number of laundry, the date of receipt, a washing method, a laundry cost, and the like.

Such information is displayed on an invoice, a customer may keep information on laundry left at a laundry shop in a document form. Accordingly, the invoice may be used as documentary evidence when accidents such as incorrect washing and incorrect delivery occur later.

Since the tag portion 110 is further included in the invoice, it is preferred to provide one more of the tag portion 110 than the number of pieces of laundry left by a customer. For example, as illustrated in FIG. 1, when the number of laundry left by a customer is one, two tag portions 110 may be provided. One of the tag portions 110 may be attached to laundry, and the other may be attached to an invoice.

Meanwhile, FIG. 2 illustrates tag portions 210 according to embodiments of the present disclosure. The tag portions 210 may be integrally formed. In addition, a cutout portion 210a may be formed between each of the tag portions 210. Accordingly, loss of the tag portion 210 constituted of a plurality of pieces may be reduced, and mixing with other tag portions 210 may be prevented.

The box number portion 120, which is provided to distinguish a plurality of laundry shops, may be formed by printing a unique number on one surface of the tag portion 110. As the tag 100 for managing laundry is provided with the box number portion 120, respective laundry shops are issued a unique identification number.

That is, since the tag 100 for managing laundry is purchased in bulk from an outside store such as a wholesaler specialized in laundry supplies, the tag 100 for managing laundry having the same number may be provided to a plurality of laundry shops when the box number portion 120 is absent. Accordingly, when a wholesaler supplies the tag 100 for managing laundry printed with the box number portion 120 unique to each piece of laundry shop, the box number portion 120 printed on the tag 100 for managing laundry becomes a unique identification number of the laundry shop.

For example, the box number portion 120 may be composed of three digits, e.g., a total of 1000 digits from 000 to 999. That is, each piece of laundry shop may be provided with an identification number of 000 to 999.

In particular, once a laundry shop "A" is provided with the tag 100 for managing laundry that is printed with a box number portion 120 of 000, the box number portion 120 of 000 becomes an identification number of the laundry shop "A." Subsequently, when the laundry shop "A" additionally purchases the tags 100 for managing laundry, a wholesaler only provides tags 100 for managing laundry printed with the box number portion 120 of 000 to the laundry shop "A."

As one laundry shop is provided with a unique box number portion 120 as described above, a plurality of laundry shops may be distinguished by the box number portion 120.

The laundry number portion 130, which is provided to confirm the number of pieces of laundry left by a customer, may be formed by printing the number of pieces of laundry, which have been left by a customer, on one surface of the tag portion 110. For example, when one piece of laundry is left by a customer, "1" may be printed on the tag portion 110 and, when ten pieces of laundry are left by a customer, "10" may be printed on the tag portion 110.

As the number of pieces of laundry left by a customer is printed on the tag portion 110 as described above, loss of laundry may be prevented by checking whether the number of actually stocked laundry matches the number of pieces of laundry printed on the tag portion 110.

The barcode part 140, which is provided for transfer of laundered laundry from a laundry plant to a laundry shop, may be formed by printing a barcode including information of the box number portion 120 and laundry number portion 130 on one surface of the tag portion 110. That is, information of the box number portion 120 and the laundry number portion 130 is converted into a barcode and printed on the tag portion 110. Here, the barcode part 140 may be printed by means of a publicly known barcode generator.

As the barcode part 140 is printed on the tag portion 110 as described above, a laundry plant may classify laundry by laundry shop by scanning the barcode part 140 using a barcode scanner.

For example, when a barcode part 140 where the laundry shop "A" is designated as a box number portion 120 of 000 is scanned, a laundry plant recognizes laundry provided with the box number portion 120 of 000 as laundry of the laundry shop "A" and classifies the laundry into laundry of the laundry shop "A". Like this, when a barcode part 140 where the laundry shop "B" is designated as a box number portion 120 of 333 is scanned, a laundry plant recognizes laundry provided with the box number portion 120 of 333 as laundry of the laundry shop "B" and classifies the laundry into laundry of the laundry shop "B".

On one side of the barcode part 140, arabic numerals corresponding to a barcode may be printed along with the barcode part 140. Accordingly, when the barcode part 140 is damaged, laundry may be classified by laundry shop by directly inputting the arabic numerals into a barcode scanner.

Meanwhile, when a laundry plant scans the barcode part 140 on the tag portion 110 of laundry by means of a barcode scanner, information of the barcode part 140 may be input to the barcode scanner. Accordingly, input of laundry into a laundry plant and output therefrom may be managed in a computerized manner.

The tag 100 for managing laundry may further include the tag number portion 150 formed by printing a unique number on one surface of the tag portion 110 to distinguish the plurality of tag portions 110. Accordingly, the barcode part 140 may further include information of the tag number portion 150 other than information of the box number portion 120 and laundry number portion 130.

As the barcode part 140 further includes information of the tag number portion 150 as described above, it may be prevented to differently recognize the barcode part 140 of the same tag 100 for managing laundry although the barcode part 140 is scanned several times. That is, when the tag number portion 150 is absent, a barcode scanner may recognize a barcode part 140 of one tag 100 for managing laundry as a different one whenever the barcode part 140 is scanned.

In addition, when laundry is lost, it is much easier to find the lost laundry by using the tag number portion 150 along with the box number portion 120 and the laundry number portion 130.

The tag 100 for managing laundry may further include the laundry-specific number portion 160 for distinguishing a plurality of pieces of laundry. Here, the laundry-specific number portion 160 may be formed by printing a respective serial number on one surface of the tag portion 110.

For example, when the number of pieces of laundry is one, two tag portions 110 are prepared. A laundry-specific number portion 160 marked as "0" is printed on one of the tag portions 110, and a laundry-specific number portion 160 marked as "1" is printed on the other tag portion 110.

In addition, when the number of pieces of laundry is two, three tag portions 110 are prepared. A laundry-specific number portion 160 marked as "0" is printed on one tag portion 110, and laundry-specific number portions 160 respectively marked as "1" and "2" may be respectively printed on the other tag portions 110. Here, the tag 100 for managing laundry printed with the laundry-specific number portion 160 marked as "0" is preferably attached to an invoice issued to a customer.

FIG. 3 illustrates a block diagram of a method of classifying and transferring laundry of according to an embodiment of the present disclosure. Here, a method (S100) of classifying and transferring laundry is used to reduce loss and incorrect delivery of laundry transferred between a plurality of laundry shops and a laundry plant.

Referring to FIGS. 1 to 3, the method (S100) of classifying and transferring laundry includes a step (S110) of collecting laundry, a step (S120) of respectively attaching a tag portion to laundry left by a customer, a step (S130) of transferring the laundry to a laundry plant, a step (S140) of scanning a barcode part of the tag portion attached to the laundry, and a step (S150) of transferring laundry to laundry shops.

In the step (S110) of collecting laundry, at least one piece of laundry left by customers is taken through laundry shops. Here, the tag 100 for managing laundry may be manufactured by an outside store such as a wholesaler specialized in laundry supplies, and laundry shops may purchase batchwise and use the same. That is, a wholesaler manufactures the tag 100 for managing laundry by printing the barcode part 140 including information of the box number portion 120, the laundry number portion 130, the box number portion 120, and the laundry number portion 130 on the tag portion 110, and laundry shops purchase and use the manufactured tag 100.

Here, since the unique box number portion 120 for distinguishing a plurality of laundry shops is printed on the tag 100 for managing laundry, a unique identification number is provided to laundry shops according to the box number portion 120. That is, once the tag 100 for managing laundry printed with a box number portion 120 of "000" is provided to a laundry shop "A", the laundry shop "A" is continuously provided with the tag 100 for managing laundry printed with the box number portion 120 of 000.

Since respective laundry shops are provided with a unique identification number through the box number portion 120 as described above, the plurality of laundry shops are not provided with a tag 100 for managing laundry having the same number. Accordingly, an accident such as laundry change between laundry plants or incorrect delivery may be prevented.

Meanwhile, since the tag 100 for managing laundry is purchased at a wholesaler, the step (S110) of collecting laundry may include a process of purchasing the tag 100 for managing laundry from the outside to prepare the tag 100 for managing laundry and a process of collecting at least one piece of laundry from a customer.

In the step (S120) of respectively attaching a tag portion to laundry left by a customer, the box number portion 120 for distinguish a plurality of laundry shops, the laundry number portion 130 for checking the number of pieces of laundry left by a customer, and the tag portion 110 printed with the barcode part 140 including information of the box number portion 120 and the laundry number portion 130 are attached to each piece of laundry left by a customer.

Here, since laundry shops may be stocked with laundry left by a plurality of customers, it is preferred to attach the tag portion 110 to each piece of laundry once the laundry is stocked such that the laundry is not changed between customers.

Meanwhile, a plurality of tag portions 110 may be provided, and the tag number portion 150 for distinguishing the tag portions 110 from each other may be further included. In particular, the tag number portion 150 may be printed on one surface of each of the tag portions 110, and laundry left by a customer may be provided with the tag number portion 150 having the same number. That is, the tag number portion 150 may be used to distinguish between a plurality of customers.

Each of the tag portions 110 may further include the laundry-specific number portion 160 for distinguishing between a plurality of pieces of laundry. In particular, the laundry-specific number portion 160 may be printed on one surface of each of the tag portions 110, and each of the plurality of tag portions 110 may be provided with a unique number, i.e., a serial number-type laundry-specific number portion 160.

Since the tag number portion 150 and the laundry-specific number portion 160 are printed on the tag portion 110 as described above, the barcode part 140 may further include information of the tag number portion 150 and the laundry-specific number portion 160.

The tag portion 110 may be further included in an invoice issued to a customer. To accomplish this, the step (S120) of respectively attaching a tag portion to laundry left by a customer may include a process of issuing an invoice to a customer and a process of installing the tag portion 110 on the invoice.

In the step (S130) of transferring the laundry to a laundry plant, laundry to which the tag portion 110 has been attached is transferred to a laundry plant. Accordingly, laundry transferred from laundry shops is collected at a laundry plant, and the laundry transferred from the laundry shops may be washed at the same time. Accordingly, waste of a detergent and electric power may be reduced, and at the same time, initial installation costs may be reduced because laundry shops are not required to have expensive washing equipment.

When laundry is transferred to a laundry plant, the laundry may be stored in boxes and, in this state, may be transferred to the laundry plant. After transferring, the boxes may be respectively marked with the box number portion 120 such that the boxes are not changed between laundry shops.

To accomplish this, the step (S130) of transferring the laundry to a laundry plant may include a process of preparing a box marked with the box number portion 120, a process of determining whether the box number portion 120 marked on the box matches the box number portion 120 printed on the tag portion 110, a process of storing laundry in the box when the box number portion 120 marked on the box matches the box number portion 120 printed on the tag portion 110, and a process of transferring the laundry stored in the box to a laundry plant.

In the step (S140) of scanning a barcode part of the tag portion attached to the laundry, when washing of laundry left at the laundry plant is completed, the barcode part 140 of the tag portion 110 attached to the laundry is scanned by means of a barcode scanner at a laundry plant.

As the barcode part 140 is scanned by means of a barcode scanner as described above, the box number portion 120, the laundry number portion 130, and information of the tag number portion 150 and the laundry-specific number portion 160 is input to and output from the barcode scanner. Accordingly, when laundry is lost or changed, laundry may be tracked though data stored in the barcode scanner.

In the step (S150) of transferring laundry to laundry shops, laundry is classified by laundry shop according to scanned information, and classified laundry is transferred to laundry shops. Since laundry may be classified by laundry shop only through a scanning process described above, classification time and labor may be reduced. Even if laundry is mistakenly transferred to a different laundry shop, the laundry may be directly transferred from the incorrect laundry shop to a desired laundry shop because the box number portion 120 is printed on the tag portion 110.

Meanwhile, classified laundry may be stored in boxes and, in this state, may be transferred to laundry shops. Here, as the boxes, the boxes used in the step (S130) of transferring the laundry to a laundry plant may be used.

In particular, the step (S150) of transferring laundry to laundry shops may include a process of determining whether the box number portion 120 marked on a box matches the box number portion 120 printed on the tag portion 110, a process of storing laundry in the box when the box number portion 120 marked on the box matches the box number portion 120 printed on the tag portion 110, and a process of transferring the laundry stored in the box to laundry shops.

The laundry which has been transferred to laundry shops may be classified by a customer again. In this case, laundry may be classified by a customer by the tag number portion 150 printed on the tag 100 for managing laundry. Here, the tag number portion 150 may be formed by printing arabic numerals on one surface of the tag portion 110, and may be formed such that a different number is provided to each customer. In addition, laundry left by one customer may be provided with the same tag number portion 150.

Since the tag portion 110 of the tag 100 for managing laundry is printed with the box number portion 120 for distinguishing a plurality of laundry shops as described above, laundry which has been washed may be classified by laundry shop.

In addition, since the barcode part 140 including various laundry information is printed on the tag portion 110, a laundry plant may check information on laundry only by scanning the barcode part 140. Accordingly, laundry may be easily classified, and information on each piece of laundry may be managed in a computerized manner.

In addition, since arabic numerals corresponding to a barcode are also printed on one side of the barcode part 140, laundry may be classified by laundry shop by directly inputting arabic numerals to a barcode scanner when the barcode part 140 is damaged.

In addition, the tag 100 for managing laundry is previously manufactured and supplied to respective laundry shops. Accordingly, the laundry shops purchase the tag 100 for managing laundry printed with the pre-determined box number portion 120. Therefore, rapid supply of the tag 100 for managing laundry and massive printing thereof are possible, whereby quality improvement of the tag 100 for managing laundry may be anticipated.

Further, since respective laundry shops do not require purchase of an expensive printer and barcode generator, and the like, initial installation costs may be reduced.

As apparent from the above description, since the tag portion is printed with the box number portion for distinguishing a plurality of laundry shops as described above, laundry which has been washed may be classified by laundry shop.

In addition, since the barcode part including various laundry information is printed on the tag portion, a laundry plant may check information on laundry only by scanning the barcode part. Accordingly, laundry may be easily classified, and information on each piece of laundry may be managed in a computerized manner.

In addition, since arabic numerals corresponding to a barcode are also printed on one side of the barcode part, laundry may be classified by laundry shop by directly inputting arabic numerals to a barcode scanner when the barcode part is damaged.

In addition, the tag for managing laundry is previously manufactured and supplied to respective laundry shops. Accordingly, the laundry shops purchase the tag for managing laundry printed with the pre-determined box number portion. Therefore, rapid supply of the tag for managing laundry and massive printing thereof are possible, whereby quality improvement of the tag for managing laundry may be anticipated.

Further, since respective laundry shops do not require purchase of an expensive printer and barcode generator, and the like, initial installation costs may be reduced.

Although the present disclosure has been described with reference to an embodiment illustrated in the accompanying drawings, the embodiment is merely selective and those skilled in the art will appreciate that various modifications, additions and substitutions are possible, without departing from the scope and spirit of the invention. Therefore, the scope and spirit of the present disclosure should be defined by the following claims.

DESCRIPTION OF SYMBOLS

110: TAG PORTION
120: BOX NUMBER PORTION
130: LAUNDRY NUMBER PORTION
140: BARCODE PART
150: TAG NUMBER PORTION
160: LAUNDRY-SPECIFIC NUMBER PORTION

What is claimed is:

1. A method of classifying and transferring laundry to reduce loss and incorrect delivery of laundry transferred between a plurality of laundry shops and a laundry plant, the method comprising:
    collecting at least one piece of laundry left by customers at the laundry shops;
    respectively attaching a box number portion for distinguishing between the laundry shops, a laundry number portion for checking the number of pieces of laundry left by the customers, and a tag portion printed with a barcode part comprising information of the box number portion and the laundry number portion to the laundry left by the customers;
    transferring the tag portion-attached laundry to a laundry plant;
    scanning the barcode part of the tag portion respectively attached to the laundry by means of a barcode scanner when washing of the laundry transferred to the laundry plant is completed; and
    classifying the laundry by laundry shop according to scanned information and transferring the classified laundry to the laundry shops
    wherein the transferring of the tag portion-attached laundry to a laundry plant comprises:
    a process of preparing a box marked with the box number portion;
    a process of determining whether the box number portion marked on the box matches a box number portion printed on the tag portion;
    a process of storing the laundry in the box when the box number portion marked on the box matches the box number portion printed on the tag portion; and
    a process of transferring the laundry stored in the box to the laundry plant.

2. The method according to claim 1, wherein the tag portion comprises another tag portion and further comprises a tag number portion for distinguishing the tag portion.

3. The method according to claim 1, wherein the tag portion further comprises a laundry specific number portion for respectively distinguishing the laundry.

4. The method according to claim 1, wherein the respectively attaching comprises:
    a process of issuing an invoice to each of the customers; and
    a process of installing the tag portion on the invoice.

5. The method according to claim 1, wherein the collecting comprises:
    a process of preparing the tag for managing laundry by purchasing the tag for managing laundry at an outside store, and
    a process of collecting at least one piece of laundry from the customers.

6. The method according to claim 1, wherein the transferring of the classified laundry to the laundry shops comprises:
    a process of determining whether a box number portion marked on a box matches a box number portion printed on the tag portion;
    a process of storing the laundry in the box when the box number portion marked on the box matches the box number portion printed on the tag portion; and
    a process of transferring the laundry stored in the box to the laundry shops.

* * * * *